US008158542B2

(12) United States Patent
Werdecker et al.

(10) Patent No.: US 8,158,542 B2
(45) Date of Patent: Apr. 17, 2012

(54) SIO₂ SLURRY FOR THE PRODUCTION OF QUARTZ GLASS AS WELL AS THE APPLICATION OF THE SLURRY

(75) Inventors: Waltraud Werdecker, Hanau (DE); Norbert Traeger, Maintal (DE); Juergen Weber, Kleinostheim (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 295 days.

(21) Appl. No.: 12/311,446

(22) PCT Filed: Sep. 12, 2007

(86) PCT No.: PCT/EP2007/059565
§ 371 (c)(1),
(2), (4) Date: Mar. 30, 2009

(87) PCT Pub. No.: WO2008/040615
PCT Pub. Date: Apr. 10, 2008

(65) Prior Publication Data
US 2009/0266110 A1    Oct. 29, 2009

(30) Foreign Application Priority Data
Sep. 29, 2006    (DE) .......................... 10 2006 046 619

(51) Int. Cl.
*C03C 3/076*    (2006.01)
(52) U.S. Cl. ........................................... 501/55; 501/53
(58) Field of Classification Search .................... 501/87, 501/88, 154, 53, 54, 55
See application file for complete search history.

(56) References Cited

U.S. PATENT DOCUMENTS

| | | | |
|---|---|---|---|
| 436,364 A | | 12/1982 | Bachman et al. |
| 5,053,359 A | * | 10/1991 | Loxley et al. ............... 501/4 |
| 5,665,133 A | * | 9/1997 | Orii et al. ............... 65/17.6 |

(Continued)

FOREIGN PATENT DOCUMENTS
DE        19943103    *    9/1999
(Continued)

OTHER PUBLICATIONS
Espacenet Abstract for EP 1 516 864 A2 (Mar. 23, 2005).

*Primary Examiner* — Matthew Daniels
*Assistant Examiner* — Yana Belyaev
(74) *Attorney, Agent, or Firm* — Tiajoloff & Kelly LLP

(57) ABSTRACT

A known $SiO_2$ slurry for the production of quartz glass contains a dispersion liquid and amorphous $SiO_2$ particles with particle sizes to a maximum of 500 μm, wherein the largest volume fraction is composed of $SiO_2$ particles with particle sizes in the range 1 μm-60 μm, as well as $SiO_2$ nanoparticles with particle sizes less than 100 nm in the range 0.2-15% volume by weight (of the entire solids content). In order to prepare such a slurry for use, and to optimize the flow behavior of such a slurry with regard to later processing by dressing or pouring the slurry mass, and with regard to later drying and sintering without cracks, the invention suggests a slurry with $SiO_2$ particles with a multimodal distribution of particle sizes, with a first maximum of the sizes distribution in the range 1 μm-3 μm and a second maximum in the range 5 μm-50 μm, and a solids content (percentage by weight of the $SiO_2$ particles and the $SiO_2$ nanoparticles together) in the range 83%-90%.

16 Claims, 1 Drawing Sheet

U.S. PATENT DOCUMENTS

| | | | |
|---|---|---|---|
| 6,012,304 A * | 1/2000 | Loxley et al. | 65/111 |
| 6,355,587 B1 * | 3/2002 | Loxley et al. | 501/54 |
| 6,381,986 B1 * | 5/2002 | Loxley et al. | 65/17.5 |
| 6,699,808 B1 * | 3/2004 | Schwertfeger et al. | 501/20 |
| 6,890,873 B2 * | 5/2005 | Oswald et al. | 501/54 |
| 6,946,030 B2 * | 9/2005 | Schwertfeger et al. | 117/200 |
| 7,192,461 B2 * | 3/2007 | Morii et al. | 51/308 |
| 7,563,512 B2 * | 7/2009 | Maul et al. | 428/428 |
| 2004/0216486 A1 * | 11/2004 | Schwertfeger et al. | 65/17.2 |
| 2005/0129603 A1 * | 6/2005 | Szillat et al. | 423/335 |
| 2006/0038470 A1 * | 2/2006 | Maul et al. | 313/113 |

FOREIGN PATENT DOCUMENTS

| | | |
|---|---|---|
| DE | 199 43 103 A1 | 3/2001 |
| DE | 102004051846 | * 10/2004 |
| DE | 103 19 300 A1 | 11/2004 |
| DE | 10 2004 051 846 A1 | 3/2006 |
| EP | 1 516 864 A2 | 3/2005 |

* cited by examiner

SIO₂ SLURRY FOR THE PRODUCTION OF QUARTZ GLASS AS WELL AS THE APPLICATION OF THE SLURRY

The present invention relates a SiO₂ slurry for the production of quartz glass, with the slurry containing a dispersion liquid and amorphous SiO₂ particles with particle sizes up to a maximum of 500 μm, wherein the largest volume fraction is composed of SiO₂ particles with particles sizes in the range of 1 μm to 60 μm, as well as SiO₂ nanoparticles with particle sizes of less than 100 nm in the range of 0.2% by wt. to 15% by wt. (of the entire solids content).

Moreover, the present invention relates to a special use of the slurry.

The quartz glass to be produced is present as a functional coating of a base body (carrier), or in the form of an opaque or translucent quartz glass component, for instance a band- or plate-shaped quartz glass component.

A great number of different techniques are known for the production of plate-shaped quartz glass components. For instance, U.S. Pat. No. 4,363,647 suggests that a planar layer of SiO₂ soot should be continuously deposited by means of deposition burners on a pre-sintered sand bed and vitrified by means of a ribbon burner while producing a quartz glass plate.

Crucible pulling methods for producing quartz glass plates are also known. However, the lateral dimensions of the plate are limited by the diameter of the crucible. This may lead to corrugations of the withdrawn quartz glass plate, and the achievable dimensional stability is relatively poor. Moreover, the manufacture of opaque quartz glass plates in a melting method is not possible without taking special measures for producing or maintaining opacity in the molten state.

For some time components and layers consisting in part or entirely of opaque quartz glass have been used in applications as optical reflectors for generating a diffuse reflection. These reflectors are distinguished by an adequately high degree of reflection at a very high temperature and thermal shock resistance. DE 10 2004 051 846 A1 describes the manufacture of such a reflector by means of a slurry method. In this process a highly filled, castable, aqueous slurry is prepared that contains amorphous SiO₂ particles and is applied in the form of a slurry layer to a base body of quartz glass. The amorphous SiO₂ particles are produced by wet milling SiO₂ granules and have a particle size in the range of not more than 500 μm, with SiO₂ particles with particle sizes in the range between 1 μm and 50 μm accounting for the greatest volume fraction.

The solids content, the particle size and the particle size distribution of the SiO₂ particles have impacts on the drying shrinkage of the slurry layer. For instance, drying shrinkage can be reduced by using rather coarse SiO₂ particles. Together with a high solids content, SiO₂ particles in the order of 1 μm and 50 μm show advantageous sintering properties and a comparatively low drying shrinkage. Therefore, the known slurry layer can be dried and vitrified without crack formation, which is also due to interactions arising among the SiO₂ particles in the aqueous phase of the slurry.

For the application of the slurry layer to the base body, spraying, electrostatically supported spraying, flow coating, spinning, immersion and dispersion coating are suggested. The slurry layer is subsequently dried and vitrified.

DE 103 19 300 A1 discloses a method for the production of a shaped silica glass body by electrophoretic deposition. A dispersion according to the type mentioned at the outset is here started from, the dispersion containing larger amorphous SiO₂ particles with a $D_{50}$ value between 1 μm and 200 μm and smaller amorphous SiO₂ nanoparticles with a grain size in the range of 1 nm to 100 nm. The fraction of the SiO₂ nanoparticles is preferably between 1-10% by wt., with the larger amorphous SiO₂ particles forming the remainder up to 100%. The filling degree of the dispersion is between 10% by wt. and 80% by wt., preferably between 50% by wt. and 70% by wt., and its viscosity is between 1-1000 mPa·s, preferably between 1-100 mPa·s.

However, it has been found that the flow behavior of the known slurry is not optimal for some coating techniques. With a highly filled slurry according to DE 10 2004 051 846 A1, for instance, "dressing" or spreading by doctor blade of the slurry mass turns out to pose problems, and although the low-viscosity dispersion according to DE 103 19 300 A1 can be poured out easily, it flows off from the coated surface immediately, so that only flat coating geometries are possible and small layer thicknesses are also only achievable, which in addition tend to form cracks during drying and sintering.

Since the slurry technique as such would permit an inexpensive production of exact layers and whole quartz glass components, it would be desirable to eliminate said drawbacks.

It is therefore the object of the present invention to prepare a slurry with a flow behavior that has been optimized with respect to processing by dressing or pouring of the slurry mass and with respect to drying and sintering without cracks.

Moreover, it is the object of the present invention to indicate a special use of the slurry according to the invention.

As for the slurry, said object starting from the slurry mentioned at the outset is achieved according to the invention in that the SiO₂ particles have a multimodal particle size distribution with a first maximum of the size distribution in the range of 1 μm to 3 μm and a second maximum in the range of 5 μm to 50 μm, and that the solids content (percentage by weight of the SiO₂ particles and the SiO₂ nanoparticles together) are in the range of 83% to 90%

Typically, the above-mentioned highly filled and highly viscous slurry shows a dilatant-rheopexic behavior. This means that upon mechanical action (such as stirring, shaking, filling, dispersion coating, stripping, spreading by doctor blade) the slurry exhibits increased viscosity (dilatancy) or that after mechanical impact the viscosity is increased for a short period of time (rheopexy). These closely related flow properties of the slurry shall be termed "rheopexy" or "rheopexic" in the following.

Thus the known slurry thickens under mechanical action. This flow behavior turns out to be disadvantageous when a slurry layer is applied to and distributed over a surface by means of a tool, for instance during dispersion coating or stripping, troweling, dressing, scraping, filling, or the like. The known high-viscosity slurry is not well suited for these application techniques, which shall be summarized hereinafter under the term "spreading by doctor blade", as it solidifies under the action of the distributing force, thereby counteracting a uniform distribution. In the inactive condition it can become liquid again and then flow off from oblique surfaces. The photo of FIG. 2 shows the result of a doctor blade test using a slurry as described in DE 10 2004 051 846 A1.

It has been found that the flow behavior of such a slurry will change due to the addition of a small amount of SiO₂ nanoparticles towards a structurally viscous thixotropic behavior.

"Thixotropy" of the slurry manifests itself in that with a constant shear stress (for instance at a constant stirring rate) its viscosity is continuously decreasing for some time. Related therewith is "structural viscosity" in the case of which the viscosity is also reduced due to shear, but which is not further decreasing at a constant shear stress.

These closely related flow properties of the slurry shall be jointly termed as "thixotropy" or "thixotropic" in the following.

Due to its thixotropic flow behavior the slurry according to the invention will liquefy under shear stress. This property is conducive to a uniform outflow and to the distribution of the slurry mass over a surface—also under the action of a force with a distributing effect.

The flow behavior of the slurry is above all defined by the solids content, namely in combination with and in dependence upon the content of $SiO_2$ nanoparticles and the particle size distribution of the amorphous $SiO_2$ particles. This shall be explained in more detail hereinafter:

The solids content (percentage by weight of the $SiO_2$ particles and the $SiO_2$ nanoparticles together) of the slurry according to the invention is relatively high at a value ranging between 83% and 90%. Also without the addition of nanoparticles, the high solids content effects a high viscosity of the slurry, thereby contributing to a uniform and low shrinkage of the slurry layer, so that cracks caused by drying and sintering are reduced. Very high solids contents of more than 90% reduce the further processing possibilities of the slurry even if it is mixed with $SiO_2$ nanoparticles.

The addition of $SiO_2$ nanoparticles creates interactions between the amorphous $SiO_2$ particles. The rather thixotropic behavior of the slurry according to the invention is due to diminishing interactions between the $SiO_2$ particles upon occurrence of shear forces. After omission of the shear forces, in the passive state of the slurry mass, these interactions will augment again, leading to the formation of physical or chemical bonds between the amorphous $SiO_2$ particles of the slurry mass among one another, which stabilize the inactive slurry mass.

The amorphous $SiO_2$ particles have a multimodal particle size distribution. Such a multimodal particle size distribution has at least two, preferably three or more, distribution maxima. This is conducive to the setting of a high true density of the slurry, whereby shrinkage during drying and sintering and thus the risk of crack formation is reduced. For instance, particle distributions with $D_{50}$ values of 2, 5, 15, 30 and 40 μm can be used alone or in combination.

The $SiO_2$ nanoparticles can e.g. be produced by oxidation or hydrolysis of silicon-containing starting compounds (also called "pyrogenic silica" in the following) or by polycondensation of polymerizable silicon compounds ($SiO_2$ sol). When "pyrogenic silica" is used, a previous cleaning step is often useful. For this purpose pyrogenic silica is preferably present in the form of a partly solidified, "temporary" $SiO_2$ granulate, which permits the use of a standard hot chlorination method for cleaning purposes. During homogenization of the slurry the purified granulate grains will again decompose into $SiO_2$ nanoparticles due to the shear forces acting thereon.

The slurry can be easily adapted to the corresponding processing techniques by adapting the solids contents, the multimodal particle size distribution and the amount of $SiO_2$ nanoparticles within the ranges indicated in claim 1. This shall be explained in more detail hereinafter. Suitable processing techniques using such a slurry comprise spreading by doctor blade and pouring. As for the standard doctor blade techniques, a slightly higher content of $SiO_2$ nanoparticles is more appropriate for slurries to be processed by pouring.

The photo of FIG. 1 shows the result of a doctor blade test using a slurry according to the invention; it can just be seen as a uniform white area.

$SiO_2$ nanoparticles are here understood to be $SiO_2$ particles with particle sizes in the range of a few nanometers up to 100 nm. Such nanoparticles have a BET specific surface area of 40-800 $m^2/g$, preferably between 55 $m^2/g$ and 200 $m^2/g$.

At a content of less than 0.2% by wt. of said particles in the slurry the nanoparticles do not have any significant impact on the flow behavior of the slurry, whereas contents of more than 15% by wt. lead to intensified shrinkage of the slurry during drying, which might aggravate a defect-free drying and sintering. With thin slurry layers a higher content of $SiO_2$ nanoparticles can be used because thinner layers are less prone to shrinkage cracks than thicker layers.

With respect to this it has turned out to be particularly advantageous when the slurry contains between 0.5 and 5 and particularly preferably between 1 and 3% by wt. of $SiO_2$ nanoparticles (based on the entire solids content).

Preferably, the $SiO_2$ nanoparticles have particle sizes of less than 50 nm.

Small $SiO_2$ nanoparticles seal and consolidate the outer surface of the green body and thereby increase the green strength of the dried slurry as well as the sintering activity.

It has turned out to be particularly advantageous when at least 80% by wt., preferably at least 90% by wt., of the $SiO_2$ particles are made spherical.

Spherical particles facilitate the setting of a high true density in the slurry, so that stresses are reduced during drying and sintering. Moreover, it has been found that spherical $SiO_2$ particles in opaque quartz glass layers contribute to enhanced reflection, above all in the infrared range. Ideally, all $SiO_2$ particles are made spherical.

In connection with a basically high content of spherical $SiO_2$ particles it has, however, also turned out to be of advantage to some applications when the slurry contains finely divided, splintery $SiO_2$ granules.

Due to the addition of finely divided, splintery $SiO_2$ granules, which can be produced by milling, the mechanical strength of the green body is even further enhanced after drying. The higher strength has a particularly positive effect in the case of thick slurry layers. The particle sizes of the finely divided, splintery $SiO_2$ granules correspond approximately to those of the amorphous $SiO_2$ particles and the weight fraction of splintery granules is 10% by wt. at the most (based on the total solids content).

Preferably, the $SiO_2$ particles have a particle size distribution distinguished by a $D_{50}$ value of less than 50 μm, preferably less than 40 μm.

$SiO_2$ particles in this order of magnitude exhibit an advantageous sintering behavior and a comparatively low drying shrinkage so that a corresponding slurry layer can be sintered and dried particularly easily without the formation of cracks. This is due to interactions between the $SiO_2$ particles that lead to the formation of molecular $SiO_2$ bonds already in the slurry mass and therefore facilitate drying and sintering.

The dispersion liquid may be made up of an aqueous base. The polar nature of the aqueous phase of such a slurry may have an effect on the interaction of the $SiO_2$ particles. For the slurry according to the invention, however, a dispersion liquid is preferred that is based on an organic solvent, preferably on an alcoholic basis.

It has been found that a dispersion liquid of such a type makes it easy to keep a thixotropic flow behavior. Moreover, the drying process is much faster than in the case of an aqueous slurry phase. This saves time and leads to a faster fixation of the slurry layer on a carrier, so that a flowing out on the edges is avoided. With the addition of a minor water amount (<30% by vol.) in the dispersion liquid, the processing period can be adapted to the respective requirements.

It has turned out to be also advantageous, particularly with respect to a low affinity to form cracks, when the solids content (percentage by weight of the $SiO_2$ particles and the $SiO_2$ nanoparticles together) is preferably at least 85% by wt.

Preferably, the $SiO_2$ particles and the $SiO_2$ nanoparticles consist of synthetic $SiO_2$.

Synthetic $SiO_2$ is distinguished by high purity. The slurry is therefore suited for forming opaque quartz glass of high purity. The quartz glass has an impurity content of less than 1 wt. ppm, whereby it absorbs not much in the UV range up to 180 nm and is thus suited as a diffuse optical broadband reflector for use over a particularly wide wavelength range.

For the same reason the $SiO_2$ content of the amorphous $SiO_2$ particles is preferably at least 99.9% by wt.

The solids content of the slurry produced by using such particles consists of at least 99.9% by wt. of $SiO_2$ (apart from the addition of dopant). Binders or other additives are normally not needed and are ideally not contained. The content of metal oxide impurities is preferably less than 1 wt. ppm.

The cristobalite content in the dried $SiO_2$ slurry should be not more than 0.1% by wt. at the most because, otherwise, sintering of the slurry layer may cause crystallization, which may lead to waste.

To enhance the etching resistance of the quartz glass made from the slurry it has turned out to be useful when the slurry contains nitrogen, carbon or a chemical compound of these components that are incorporated into the quartz glass structure in the form of nitrides or carbides.

Nitrogen and/or carbon and/or one or more compounds of said components are added to the slurry. Nitrides or carbides effect a reinforcement of the quartz glass structure and lead to improved resistance to etching. Suitable start substances, such as silazanes or siloxanes, are particularly evenly distributed in the slurry, from which a homogeneous doping of the quartz glass of the glass mass will result in the end.

As for the use, the above-mentioned object is achieved according to the invention in that the $SiO_2$ slurry according to the invention is used for producing a diffusely reflecting reflector of quartz glass.

A diffusely reflecting reflector made from the slurry according to the invention is distinguished by a particularly high degree of reflection over a wide wavelength range. This is assumed to be due to the high solids content of the slurry and particularly to the addition of $SiO_2$ nanoparticles.

The diffusely reflecting reflector is present as an independent reflector component which is used in combination with an optical radiator, a heating element or for thermal shielding, or the reflector is formed as an opaque $SiO_2$ layer on a carrier component. The reflector can e.g. be present in the form of a tube, bulb, a compartment, bell, semi-shell, spherical or ellipsoidal segment, a plate, a heat shield, or the like.

In a first preferred alternative the diffusely reflecting reflector is used as a reflector layer of quartz glass on a carrier of quartz glass.

After drying and sintering of the slurry the reflector layer formed from the slurry forms a coating on a carrier surface or a part thereof. The carrier of quartz glass substantially performs mechanical or chemical basic functions of the overall component, e.g. mechanical strength, thermal stability and chemical resistance, while the reflector layer considerably defines the optical properties. Typical layer thicknesses are in the range of 0.2 mm to 3 mm.

The reflector layer and the carrier are here made of the same material or at least of similar materials, which has a particularly advantageous effect on the adhesion of the reflector layer to the carrier and on the thermal shock resistance of the overall component.

An alternative and equally preferred use of the slurry is characterized in that the diffusely reflecting reflector is formed as a carrier-less, preferably band- or plate-shaped quartz glass component.

The use of a highly concentrated slurry according to the invention will prevent the formation of cracks caused by shrinkage. To be more specific, plate- or band-shaped quartz glass bodies are obtained that are distinguished by a homogeneous quartz glass layer of a predetermined thickness, which may be opaque or transparent, depending on the corresponding sintering temperature and duration. Opaque plates are preferably obtained at sintering temperatures between 1200° C. and 1350° C. These are particularly suited as diffusely reflecting reflector components. At higher sintering temperatures or with long sintering periods translucence or even transparence is achieved.

For obtaining a specific reflection behavior of the diffusely reflecting reflector it has turned out to be advantageous when a slurry is used that contains one or more dopants that generate optical absorption in quartz glass in the ultraviolet, visible or infrared spectral range.

The slurry is preferably used for producing a diffusely reflecting reflector for diffuse reflection in the UV wavelength range below 240 nm.

A high reflection in the UV wavelength range (e.g. of more than 90%) down to wavelengths around 180 nm presupposes opacity and ultrahigh purity of the quartz glass. Purity is e.g. guaranteed through the use of synthetically produced $SiO_2$, where particularly a low degree of impurity with lithium oxide should be noted. The content of lithium is below 100 wt. ppb, preferably at less than 20 wt. ppb.

The invention shall now be explained in more detail with reference to embodiments and a drawing, in which.

1. PREPARATION OF A $SiO_2$ SLURRY

Figure 3:
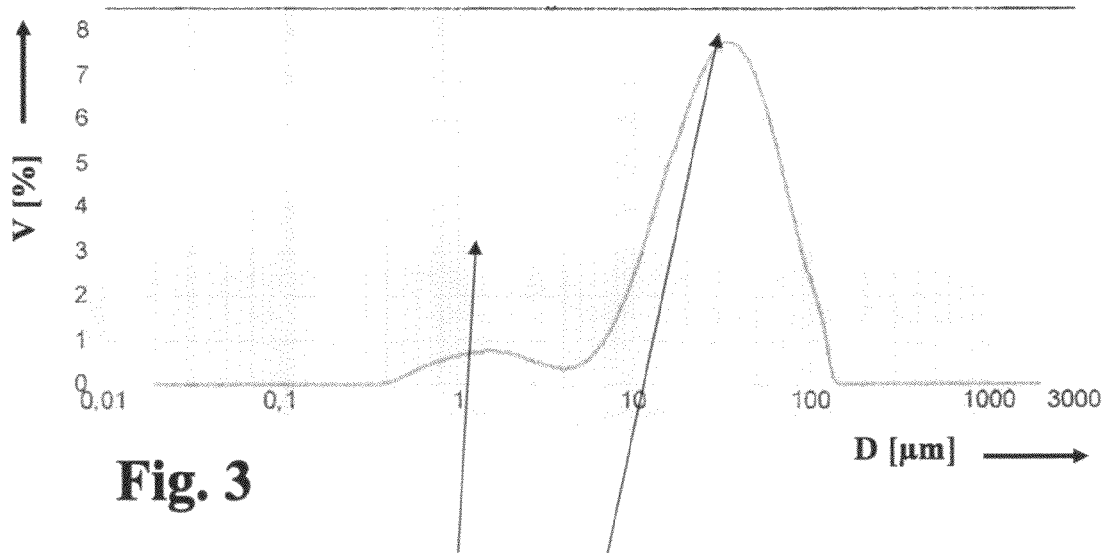
FIG. 3 shows a diagram of the $SiO_2$ particle size distribution of a raw material component for use in a slurry according to the invention (prior to the addition of $SiO_2$ nanoparticles)

FIG. 3 shows a particle size distribution of a raw material component. This is a multimodal particle size distribution with a relatively narrow maximum of the size distribution at about 30 μm ($D_{50}$ value) and with a secondary maximum in the range around 2 μm. This raw material component with a $D_{50}$ value at 30 μm shall be called $R_{30}$ hereinafter.

Figure 4:
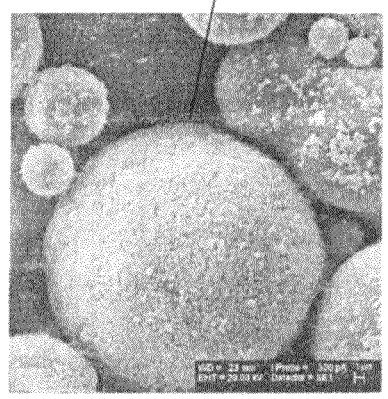
FIG. 4 shows a micrograph of the $SiO_2$ particle size distribution of the raw material component of FIG. 3.

FIG. 4 shows the particle size distribution as a SEM micrograph. It can be seen that the individual $SiO_2$ particles are made round and spherical.

For the preparation of the slurry other raw material components are used that have a $D_{50}$ value at 5 μm, 15 μm and 40 μm, and the particle size distributions of which are otherwise similar to the ones shown in FIGS. 3 and 4. Depending on their $D_{50}$ value, these raw material components are designated as $R_5$, $R_{15}$, and as $R_{40}$, respectively. Each of the raw material components are first cleaned in a hot chlorination process at a temperature in the range between 600° C. and 1200° C.

Moreover, $SiO_2$ nanoparticles with diameters of around 40 nm are used in the form of "pyrogenic silica", or in the form of a $SiO_2$ sol. The pyrogenic silica is here present as a partly solidified "temporary" $SiO_2$ granulate that is pre-treated by sintering at a low temperature in the range of 600° C. to 900° C. and partly consolidated in this process. For setting a high purity the pre-treatment is carried out in a chlorine-containing atmosphere. On account of the small primary particle sizes of the granulates the comparatively low temperature during hot chlorination is sufficient. During homogenization of the suspension the granulate grains decompose again into $SiO_2$ nanoparticles due to the shear forces acting on them.

The following recipes have turned out to be useful:

| Recipe 1 | |
|---|---|
| $R_{30}$ | 500 g |
| $R_{15}$ | 200 g |
| $R_5$ | 200 g |

Pyrogenic silica: 135 g with BET surface area of 50 $m^2/g$.

The said components are dispersed in pure ethanol, yielding a solids content of 85% by wt.

| Recipe 2 | |
|---|---|
| $R_{15}$ | 395 g |
| $R_5$ | 54 g |

Standard $SiO_2$ sol with tetraethylorthosilane (TEOS) as the $SiO_2$ degassing material in an amount yielding a $SiO_2$ weight of 6 g.

The said solids components are dispersed in 111 g pure ethanol, and $SiO_2$ sol is mixed into the homogeneous dispersion.

| Recipe 3 | |
|---|---|
| $R_{15}$ | 270 g |
| $R_5$ | 35 g |

Pyrogenic silica: 4 g with BET surface area of 50 $m^2/g$

These components are dispersed in 70 g polyvinyl butural in methanol.

The highly filled slurry prepared in this way shows a thixotropic behavior. The slurries are therefore "spreadable" and that is why they are suited for processing techniques such as doctor blade processes. In each recipe the grain sizes below 60 µm account for the greatest volume fraction of the granules.

The slurry which is exclusively produced with synthetically produced spherical $SiO_2$ particles of high purity is free of cristobalite and is distinguished by a low impurity content of less than 1 wt. ppm.

Figure 1:
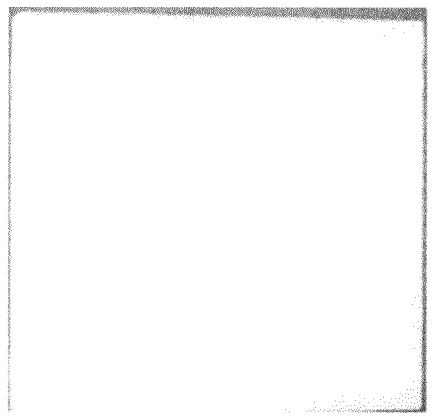
FIG. 1 shows a photograph illustrating the result of a doctor blade test using a slurry according to the invention.
Figure 2:
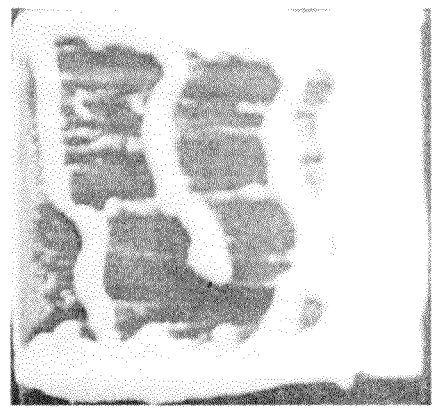
FIG. 2 shows a photograph which illustrates the result of a doctor blade test using a slurry according to the prior art.

FIG. 1 shows the result of a doctor blade test using the slurry according to recipe 1. The layer produced thereby is continuous and exhibits a uniform layer thickness so that the photo just shows a homogeneous white area. By contrast, the photo of FIG. 2 shows an irregular mass distribution with clots, as issues from spreading by doctor blade of a rheopexic $SiO_2$ slurry according to the prior art. A similar result is obtained when the pyrogenic silica is omitted in recipe 1.

2. PREPARATION OF QUARTZ GLASS USING THE SLURRY ACCORDING TO THE INVENTION

Example 1

Preparation of Diffusely Reflecting Surface Areas on a Carrier

A spreadable $SiO_2$ slurry according to the invention is used, wherein the slurry layer is produced by means of a dressing tool acting on a supply mass of the slurry in a metering and distributing manner.

The supply mass is either accumulated on the surface of the carrier, or it is contained in a reservoir from which it can pass to the carrier surface. Under the mechanical distributing action of the dressing tool and in combination with the thixotropic properties of the slurry according to the invention the viscosity is reduced, which facilitates outflow and propagation of the slurry on the surface of the carrier. This is conducive to the formation of a uniform homogeneous layer of a predetermined thickness.

The dressing tool, which performs a relative movement with respect to the carrier surface, is for instance a doctor blade tool, such as a horizontally rotating rod, a roll, a shaping tool, or the like. It is essential that the dressing tool is spaced apart from the surface of the carrier at a distance correlating with the thickness of the layer to be formed.

Preferably, the slurry supply mass is present on a gap formed between the dressing tool and the carrier, which is movable by relative movement between dressing tool and carrier along the carrier. The distance between dressing tool and carrier forms a gap on which the slurry supply mass to be distributed is positioned and the width of which corresponds to the thickness of the slurry layer to be formed.

As a rule, a constant layer thickness is desired. As a result, the gap has a width that is predetermined by a mechanical guide element along which the carrier or the dressing tool is guided for performing its relative movement. The carrier itself can here also be used as the guide element.

The relative movement of dressing tool and carrier is here carried out with the help of a mechanical guide element which, on the one hand, coordinates the relative movement and which, on the other hand, predetermines the gap between carrier and dressing tool directly or indirectly. As a result, when the relative movement is carried out, a constant gap width can be upheld in an easy way. This may e.g. be a guide rail along which the dressing tool moves across the carrier. The gap width is directly set by the thickness of the guide rail or indirectly by a stripper connected to the dressing tool.

The slurry supply mass is preferably contained in a reservoir which is arranged on the dressing tool and fluidically connected to the gap. The slurry supply mass passes continuously from the reservoir via the gap to the surface of the carrier. The reservoir is part of the dressing tool and ensures that slurry mass is always present on the gap across the whole gap width. With a movable dressing tool the reservoir is also moved with the dressing tool.

As a rule, the gap has a shape adapted to a coating surface of the carrier. This is particularly useful in the case of an elongated carrier, the coating surface of which is not flat, but comprises, for instance, curved or obliquely extending areas extending in longitudinal direction. The shape of the dressing tool is here adapted to the surface profile of the carrier and it is thereby ensured that the gap width, viewed in a direction transverse to the direction of relative movement, is constant.

In the embodiment the slurry according to recipe 2 is used for producing a reflector layer on a cladding tube for an IR radiator in the form of a so-called "twin tube" made of quartz glass.

The twin tube consists of a cladding tube which is formed as an eight when viewed in cross section and is made of quartz glass, the tube being subdivided by a central web into two compartments, each serving to accommodate a heating coil. On the upper side of the cladding tube that is oriented away from the main propagation direction a reflector layer shall be formed in the form of an opaque coating of $SiO_2$ for diffuse reflection. The production thereof shall be explained hereinafter.

The surface of the twin tube is cleaned with alcohol and then in 3% hydrofluoric acid for eliminating other surface impurities, particularly alkali and alkaline earth compounds. The twin tube is then inserted into a doctor blade device. Said device consists of an elongated carrier for supporting the twin tube, a guide rail and a dressing tool with integrated slurry reservoir which is displaceable on the guide rail along the twin tube. The dressing tool comprises a stripper with a bottom side profiled in such a way that it maintains a drawing gap of a constant width of 2 mm relative to the upper side of the twin tube. The reservoir is fluidically connected to the drawing gap and, viewed in the direction of displacement of the dressing tool, arranged in front thereof. Areas of the upper side of the twin tube that are not to be coated are covered with a sheet. The slurry is filled into the reservoir and the dressing tool is drawn off swiftly and uniformly via the guide rail along the twin tube. A shear force that due to the thixotropic flow property of the slurry leads to a decrease in viscosity so that the slurry is distributed between twin tube and stripper and exits in a uniform way and at a constant thickness out of the drawing gap is here acting on the slurry in the area of the drawing gap. The viscosity of the slurry applied to and resting on the coating surface increases again due to thixoptropy immediately after application, so that the coating does not deliquesce, but mainly maintains its form. The cover sheets are removed. A substantially constant layer thickness of the slurry layer of about 1 mm is thereby achieved.

Despite the curved surface of the twin tube, the use of the doctor blade device and of the thixotropic slurry according to the invention permits a uniform coating of the surface with slurry layer, thereby ensuring, after drying and sintering, the formation of an optically homogeneous and esthetically appealing opaque reflector layer with a thickness of 0.8 mm. Due to its high purity the layer also reflects in the ultraviolet wavelength range below 200 nm. The opaque reflector layer is also suited for use at elevated temperatures of more than 1000° C.

The reflectivity of the opaque reflector layer shall now be explained in more detail with reference to the reflection curve of FIG. 5.

FIG. 5 shows the reflection behavior of the diffuse reflector produced according to Example 1 in the form of an opaque layer of opaque $SiO_2$ layer in the wavelength range of 250 nm to 3000 nm. The degree of reflection "R" in % based on the reflectivity of "Spectralon" is plotted on the y-axis and the wavelength λ of the operating radiation in nm on the x-axis. The reflectivity is determined by means of an Ulbricht sphere.

The curve shows the reflection progress in the case of an opaque layer of opaque $SiO_2$ with a thickness of 0.8 mm, with the sintering process being carried out in a sintering furnace at 1280° C. (3 h) in air. As can be seen therefrom, the $SiO_2$ opaque layer of undoped $SiO_2$ shows an approximately uniform degree of reflection R of around 95% in the wavelength range between about 300 nm and 2100 nm. The degree of reflection at 210 nm is here still higher than 98%. This high reflection in the VUV range permits the use of components coated in this way, for instance in the UV disinfection sector.

Example 2

Production of a Quartz Glass Plate

A homogeneous slurry is prepared with the help of recipe 3. The slurry is used for producing a quartz glass plate in a doctor blade process. A slurry layer with a thickness of 5 mm is here produced on a carrier. This is only possible on account of the thixotropic flow behavior of the slurry.

After drying of the layer, which on account of the high solids content and the alcoholic base of the dispersion liquid is carried out within a few hours, the layer is sintered. Depending on sintering temperature and duration, a thin plate of transparent or opaque quartz glass is obtained.

The invention claimed is:

1. A $SiO_2$ slurry for the production of quartz glass, said $SiO_2$ slurry comprising: a dispersion liquid and amorphous $SiO_2$ particles with particle sizes up to a maximum of 500 μm, wherein a majority of the volume of the $SiO_2$ slurry is composed of $SiO_2$ particles with particles sizes in the range of 1 μm to 60 μm, and $SiO_2$ nanoparticles with particle sizes of less than 100 nm are present in the $SiO_2$ slurry in a concentration in the range of 0.2% by wt. to 15% by wt. (of an entire solids content of the $SiO_2$ slurry), wherein the $SiO_2$ particles have a multimodal distribution of particle sizes with a first maximum of the size distribution in the range of 1 μm to 3 μm and a second maximum in the range of 5 μm to 50 μm, and wherein the solids content (as a percentage by weight of the $SiO_2$ particles and the $SiO_2$ nanoparticles together) is in the range of 83% to 90%.

2. The slurry according to claim 1, wherein the slurry contains between 0.5% by wt. of $SiO_2$ nanoparticles (of the entire total solids content).

3. The slurry according to claim 1, wherein the $SiO_2$ nanoparticles have particle sizes of less than 50 nm.

4. The slurry according to claim 1, wherein at least 80% by wt. of the $SiO_2$ particles are spherical.

5. The slurry according to claim 4, wherein the slurry, contains finely divided, splintery $SiO_2$ granules.

6. The slurry according to claim 1, wherein the $SiO_2$ particles have a particle size distribution distinguished by a $D_{50}$ value of less than 50 μm.

7. The slurry according to claim 1, wherein the solids content is at least 85% by wt.

8. The slurry according to claim 1, wherein the $SiO_2$ particles and the $SiO_2$ nanoparticles consist essentially of synthetic $SiO_2$.

9. The slurry according to claim 1, wherein the $SiO_2$ content of the amorphous $SiO_2$ particles is at least 99.9% by wt.

10. The slurry according to claim 1, wherein the slurry contains a component or components comprising nitrogen, carbon or a chemical compound containing nitrogen and/or carbon and said component or components are incorporated into the quartz glass structure in the form of nitrides or carbides.

11. The slurry according to claim 1, wherein the slurry contains between 1% by wt. and 3% by wt., of $SiO_2$ nanoparticles of the entire total solids content.

12. The slurry according to claim 1, wherein at least 90% by wt. of the $SiO_2$ particles are spherical.

13. The slurry according to claim 12, wherein the slurry contains finely divided, splintery $SiO_2$ granules.

14. The slurry according to claim 1, wherein the $SiO_2$ particles have a particle size distribution distinguished by a $D_{50}$ value of less than 40 μm.

15. The slurry according to claim 1, wherein the dispersion liquid is made up on the basis of an organic solvent on an alcoholic basis.

16. The slurry according to claim 1, wherein the dispersion liquid is made up on the basis of an organic solvent.

* * * * *